United States Patent
Pomerleau

(10) Patent No.: US 10,914,166 B2
(45) Date of Patent: Feb. 9, 2021

(54) BATTERY SYSTEM FOR DOWNHOLE DRILLING TOOLS

(71) Applicant: APS Technology, Inc., Wallingford, CT (US)

(72) Inventor: Michael Pomerleau, Cromwell, CT (US)

(73) Assignee: APS Technology, Inc., Wallingford, CT (US)

( * ) Notice: Subject to any disclaimer, the term of this patent is extended or adjusted under 35 U.S.C. 154(b) by 101 days.

(21) Appl. No.: 16/126,414

(22) Filed: Sep. 10, 2018

(65) Prior Publication Data

US 2020/0080417 A1 Mar. 12, 2020

(51) Int. Cl.
*E21B 47/12* (2012.01)
*E21B 41/00* (2006.01)
*E21B 47/06* (2012.01)
*H01M 10/42* (2006.01)
*H01M 10/48* (2006.01)
*E21B 47/07* (2012.01)
*H02J 7/00* (2006.01)

(52) U.S. Cl.
CPC .............. *E21B 47/12* (2013.01); *E21B 41/00* (2013.01); *E21B 47/06* (2013.01); *E21B 47/07* (2020.05); *H01M 10/4257* (2013.01); *H01M 10/48* (2013.01); *H01M 2010/4271* (2013.01); *H02J 7/0063* (2013.01)

(58) Field of Classification Search
CPC ........ E21B 47/12; E21B 41/00; E21B 47/065; E21B 47/06; H01M 10/4257; H01M 10/48; H01M 2010/4271; H02J 7/0063
See application file for complete search history.

(56) References Cited

U.S. PATENT DOCUMENTS

| | | | | |
|---|---|---|---|---|
| 4,866,607 A | * | 9/1989 | Anderson | E21B 47/00 702/11 |
| 2009/0301723 A1 | * | 12/2009 | Gray | E21B 23/00 166/301 |
| 2015/0361788 A1 | * | 12/2015 | Liu | H02J 7/00 340/855.4 |
| 2018/0048032 A1 | * | 2/2018 | Takatsuka | H01M 10/42 |

* cited by examiner

Primary Examiner — Brad Harcourt
(74) Attorney, Agent, or Firm — Offit Kurman, PA; Gregory A. Grissett

(57) ABSTRACT

A system, assembly, module, and method are disclosed for powering a downhole tool in a drilling operation. The system may include a reusable battery module and/or controller to operate multiple batteries.

40 Claims, 13 Drawing Sheets

BATTERY SYSTEM FOR DOWNHOLE DRILLING TOOLS

TECHNICAL FIELD

The present disclosure relates to a battery system including a battery assembly for powering a downhole tool in a drilling operation, and related systems and methods.

BACKGROUND

Drilling systems are designed to drill a bore into the earth to target hydrocarbon sources. Drilling operators rely on accurate operational information to manage the drilling system and reach the target hydrocarbon source as efficiently as possible. The downhole end of the drill string in a drilling system, referred to as a bottomhole assembly, can include specialized tools designed to obtain operational information for the drill string and drill bit, and in some cases characteristics of the formation. The downhole end of the drill string may also include tools that transmit this operational information to the drilling operator at the surface. Examples of such tools include rotary pulsers, rotary steerable motor tools, vibration damping tools, measurement-while-drilling tools, logging-while-drilling tools, or downhole measurement tools.

To operate these downhole tools, the drilling system must be provided with a reliable source of power that is capable of powering the downhole tools while they are deployed downhole. Examples of such power sources include turbine alternators and batteries. When batteries are utilized to power the downhole tools, multiple batteries may be connected in parallel along the drill string. Using multiple batteries is advantageous because replacing batteries, due to a depleted charge or otherwise, requires ceasing drilling operations and removing the drill string from the bore. Any cessation in drilling operations is financially detrimental to the drilling operator. As such, using multiple batteries prolongs the period that the tools may remain powered downhole in the drilling system. Each battery may be part of a battery assembly that includes intelligence components that are capable of storing and transmitting information related to the battery to the drilling operator, so that the drilling operator can monitor the operation of the batteries while the batteries are downhole.

SUMMARY

An embodiment of the present disclosure is a downhole tool system for a drilling operation that includes a drill string configured to form a borehole in an earthen formation. The downhole tool system includes a downhole tool configured to be disposed along the drill string, and a battery assembly configured to power the downhole tool. The battery assembly includes a battery coupled to the downhole tool, where the battery has a first end, a second end opposite to the first, and a memory unit integral with the first end of the battery. The memory unit includes stored therein information related to the battery. The battery assembly also includes a module removably coupled to the first end the battery, where the module includes a processor configured to monitor information related to the battery, as well as a communications unit. The communications unit is configured to transmit the information related to the battery at least between the memory unit and the processor when the module is coupled to the first end of the battery and the processor is in electronic communication with the memory unit of the battery.

Another embodiment of the present disclosure is a battery assembly for a downhole tool used in drilling a borehole in an earthen formation. The battery assembly includes a battery having a first end, a second end opposite to the first end of the battery, and a memory unit integral with the first end of the battery. The memory unit includes stored therein the information related to the battery. The battery assembly also includes a module configured to be removably coupled to a battery, where the module has a chassis and a first connector on the chassis, where the first connector is configured to couple the module to the battery. The module further includes a processor carried by the chassis, where the processor is configured to monitor information related to the battery, and a communications unit carried by the chassis. The communications unit is configured to transmit the information related to the battery at least between the memory unit and the processor when the module is coupled to the first end of the battery and the processor is in electronic communication with the memory unit of the battery. Additionally, the module includes a second connector opposite to the first connector.

Another embodiment of the present invention is a module configured to be removably coupled to a battery used in a drilling operation that drills a borehole in an earthen formation. The module includes a chassis, a first connector on the chassis, where the first connector is configured to be removably coupled to the battery, and a processor carried by the chassis, where the processor is configured to monitor information related to the battery. The module also includes a communications unit carried by the chassis. The communications unit is configured to transmit the information related to the battery at least between the memory unit and the processor when the module is coupled to the first end of the battery and the processor is in electronic communication with the memory unit of the battery. Additionally, the module includes an elongate element coupled to the chassis and a second connector coupled to the elongate element opposite to the first connector.

A further embodiment of the present disclosure is a battery system for a downhole tool for use in a drilling operation. The battery system includes a plurality of battery assemblies, where each battery assembly includes a battery having a first end, a second end opposite to the first, and a memory unit carried by the first end of the battery, where the memory unit includes stored therein information related to the battery. Each battery assembly also includes a processor configured to monitor information related to the battery, and a communications unit configured to transmit the information related to the battery at least between the memory unit and the processor. Additionally, each battery assembly includes a switch configured to selectively activate the battery. The battery system further includes a controller electrically coupled to each switch, where the controller is configured to monitor the plurality of battery assemblies and cause each switch to selectively activate the battery.

An additional embodiment of the present disclosure is a method of powering a downhole tool in a drilling operation that forms a borehole in an earthen formation. The method includes the steps of supplying power to the downhole tool with a first battery of a first battery assembly and determining, via at least one computer processor, a capacity of the first battery of the first battery assembly. The method also includes the step of switching the supply of power to the downhole tool from the first battery of the first battery assembly to a second battery of a second battery assembly that is electrically coupled to the first battery assembly when the capacity of the first battery is depleted to a predetermined capacity. Additionally, the method includes the step of continuing to supply power to the downhole tool with the second battery of the second battery assembly.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1:
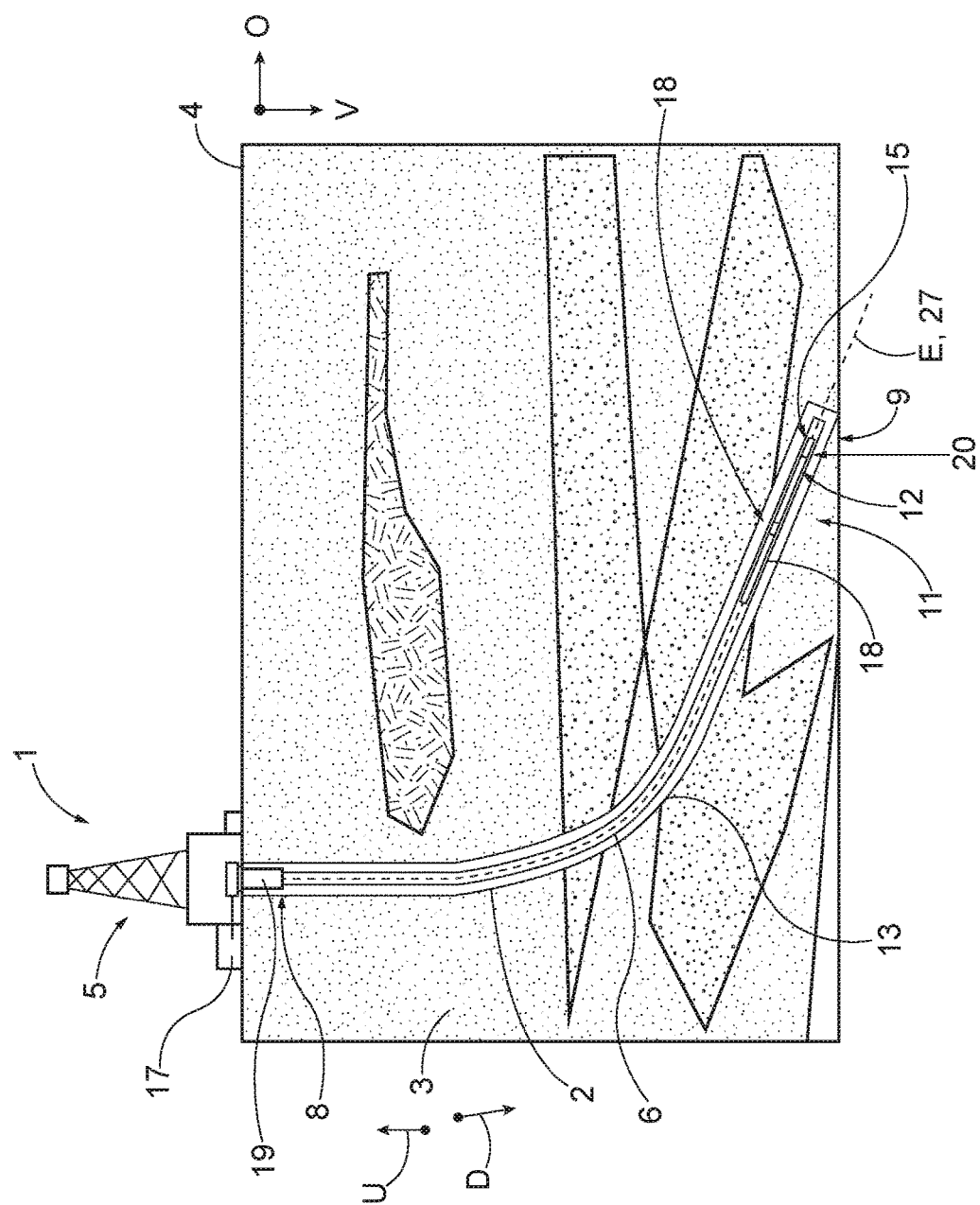
FIG. 1 is a schematic view of a drilling system according to an embodiment of the present disclosure.

Described herein is a battery assembly 10 that includes a battery 20 and a removable module 30. The battery includes an integral memory unit 112, and the module 30 includes a processor 224 and a communications unit 228. Certain terminology is used to describe the battery assembly 10 in the following description for convenience only and is not limiting. The words "right," "left," "lower," and "upper" designate directions in the drawings to which reference is made. The words "inner" and "outer" refer to directions toward and away from, respectively, the geometric center of the description to describe the battery assembly 10 and related parts thereof. The terminology includes the above-listed words, derivatives thereof, and words of similar import.

Referring to FIG. 1, a drilling system 1 includes a rig or derrick 5 that supports a drill string 6. The drill string 6 includes a bottomhole (BHA) assembly 11 coupled to a drill bit 15. The drill bit 15 is configured to drill a borehole or well 2 into the earthen formation 3 along a vertical direction V and an offset direction O that is offset from or deviated from the vertical direction V. The drilling system 1 can include a surface motor (not shown) located at the surface 4 that applies torque to the drill string 6 via a rotary table or top drive (not shown), and a downhole motor (not shown) disposed along the drill string 6 that is operably coupled to the drill bit 15. The drilling system 1 is configured to operate in a rotary steering mode, where the drill string 6 and the drill bit 15 rotate, or a sliding mode where the drill string 6 does not rotate but the drill bit does. Operation of the downhole motor causes the drill bit 15 to rotate along with or without rotation of the drill string 6. Accordingly, both the surface motor and the downhole motor can operate during the drilling operation to define the well 2. During the drilling operation, a pump 17 pumps drilling fluid downhole through an internal passage (not shown) of the drill string 6 out of the drill bit 15 and back to the surface 4 through an annular passage 13 defined between the drill string 6 and the well wall. The drilling system 1 can include a casing 19 that extends from the surface 4 and into the well 2. The casing 19 can be used to stabilize the formation near the surface. One or more blowout preventers can be disposed at the surface 4 at or near the casing 19.

Continuing with FIG. 1, the drill string 6 is elongate along a longitudinal central axis 27 that is aligned with a well axis E. The drill string 6 further includes an upstream end 8 and a downstream end 9 spaced from the upstream end 8 along the longitudinal central axis 27. A downhole or downstream direction D refers to a direction from the surface 4 toward the downstream end 9 of the drill string 6. An uphole or upstream direction U is opposite to the downhole direction D. Thus, "downhole" and "downstream" refers to a location that is closer to the drill string downstream end 9 than the surface 4, relative to a point of reference. "Uphole" and "upstream" refers to a location that is closer to the surface 4 than the drill sting downstream end 9, relative to a point of reference. The drilling system 1 includes a tool assembly 11, which can include a downhole tool 60 used to obtain data concerning the drilling operation during drilling, one or more battery assemblies 10 used to power the downhole tool 60, and a master bus 100 that can be used to control the downhole tool 60 and the battery assembly 10. The master bus 100 may also facilitate communication among the surface control system components and downhole components. In a drilling operation, the drill bit 15 drills a bore hole into an earthen formation. A mud pump pumps drilling fluid downward through the drill string 6 and into the drill bit 15. The drilling fluid then flows upward to the surface through the annular passage 13 between the bore hole and the drill string 6, where, after cleaning, it is recirculated back down the drill string 6 by the mud pump.

Figure 2:
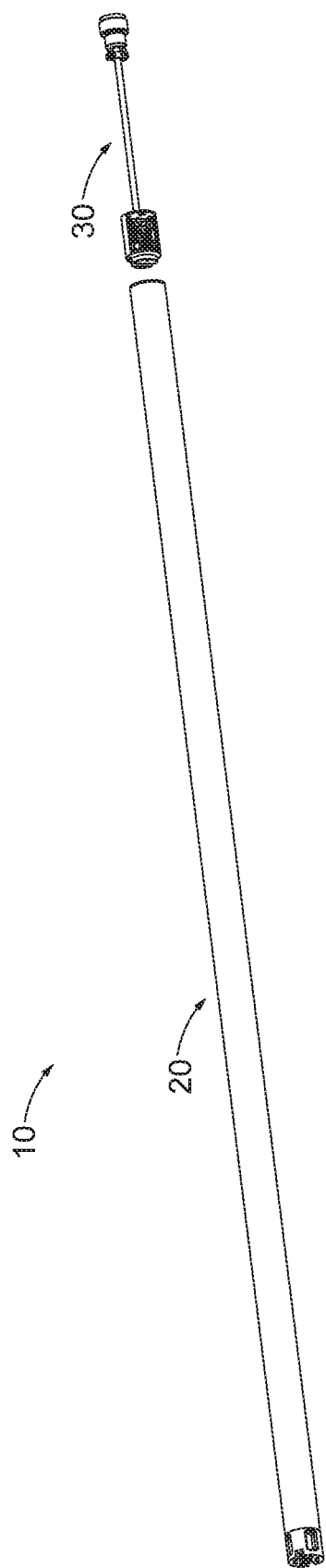
FIG. 2 is a perspective view of a battery assembly according to an embodiment of the present disclosure.
Figure 3A:
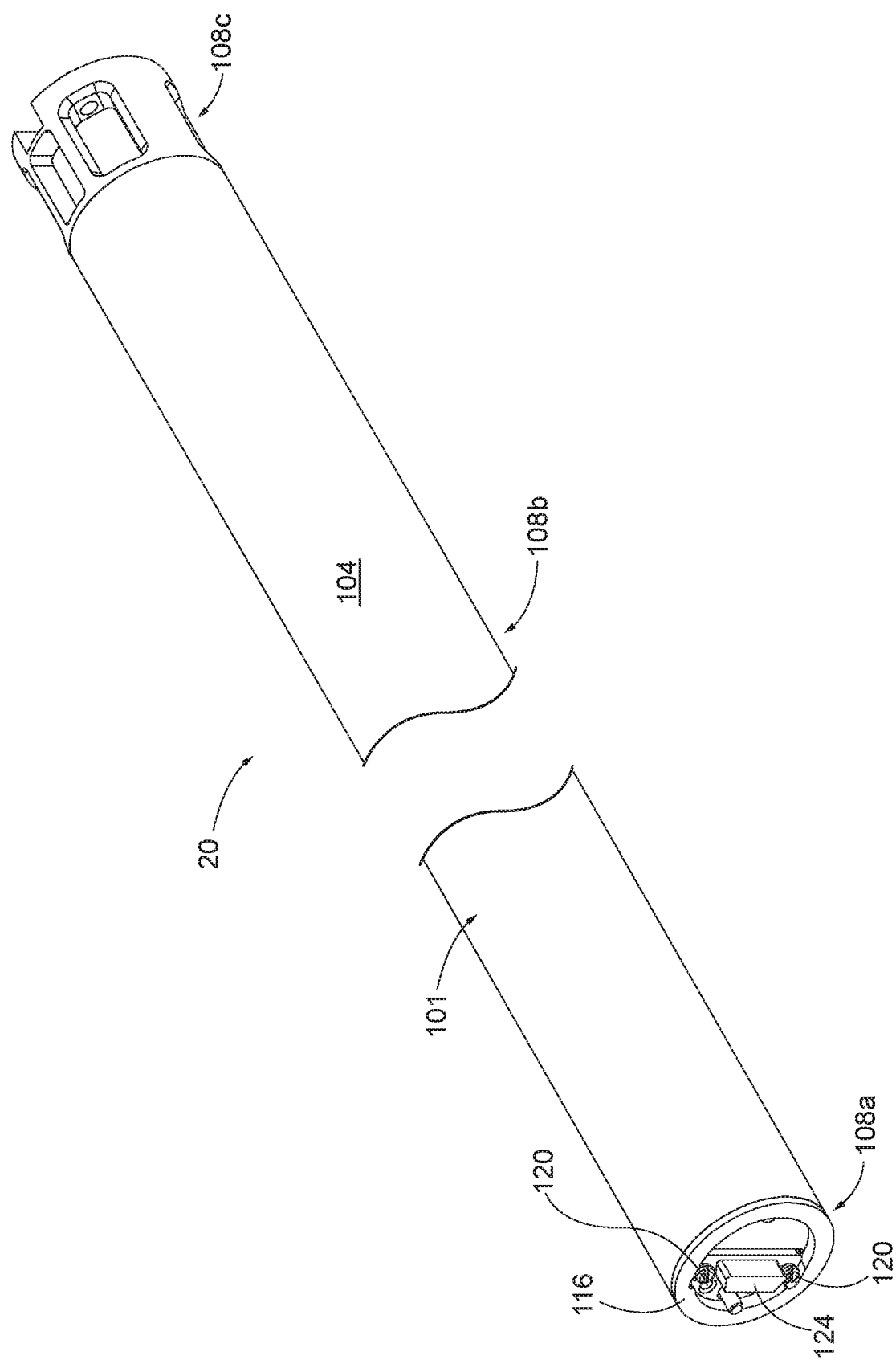
FIG. 3A is a perspective view of the battery of the battery assembly shown in FIG. 2.
Figure 3B:
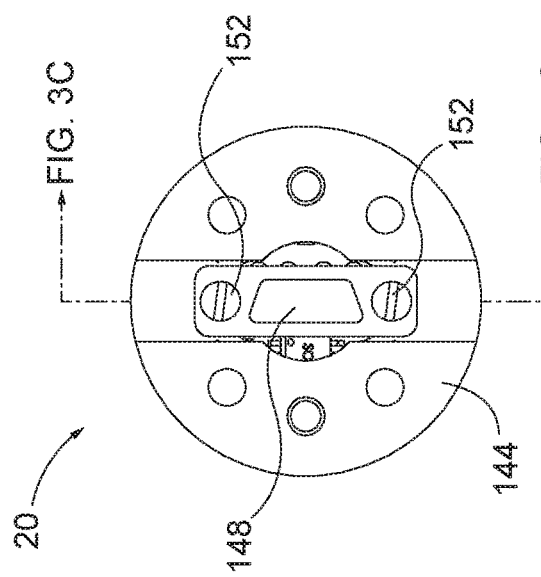
FIG. 3B is an end view of the battery shown in FIG. 3A.
Figure 3C:
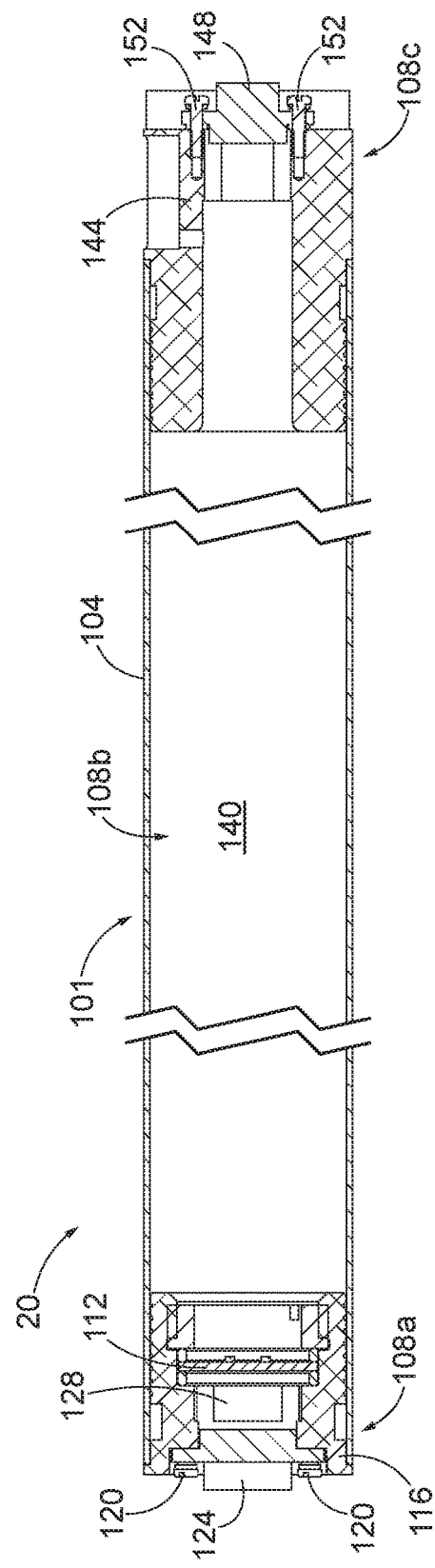
FIG. 3C is a longitudinal cross section of the battery along a plane shown in FIG. 3B.

Referring to FIGS. 2-9, an embodiment of the battery assembly 10 of the present disclosure is shown. As shown in FIGS. 2-3C, the battery assembly 10 includes a battery 20 and a module 30 releasably coupled to the battery 20. The battery assembly 10 is configured to be disposed along the drill string 6 of the drilling system 1 described above, and is used to power the downhole tool 60, or a plurality of downhole tools 60a-d, that are also disposed along the drill string 6. Based upon the power requirements of the downhole tool 60, the drilling system 1 may include more than one battery assembly 10, as will be described below. The downhole tool 60 may be any type of tool commonly used in downhole drilling, such as a rotary pulser, a rotary steerable motor tool, a vibration damping tool, a measurement-while-drilling tool, a logging-while-drilling tool, or a downhole measurement tool. Though the battery assembly 10 is described below as powering a downhole tool 60, its use is not limited to this. For example, the battery assembly 10 can also be utilized to power uphole components of the drilling system 1, such as an instrument top sub.

Turning to FIGS. 3A-3C, the battery 20 includes a body 101 that includes a first end 108a, a second end 108c opposite the first end, and a central portion 108b disposed between the first and second ends 108a and 108c. The body 101 also defines an outer surface 104 that extends along the central portion 108b between the first end 108a and the second end 108c. The first end 108a of the battery 20 may include a first end cap 116 that is received within the body 101 of the battery 20. The first end cap 116 is optionally removable from the battery 20 such that the internal components of the battery 20 may be accessed. The first end cap 116 may be secured to the body 101 of the battery 20 through an interference fit, or any other means as desired, including a snap fit, threaded engagement, or through the use of fasteners. Alternatively, the first end cap 116 may be irremovably attached to the body 101 through welding, adhesives, etc.

The first end 108a includes a first connector 124 attached to the first end cap 116. As shown in FIGS. 3A-3C, the first connector 124 is attached to the first end cap 116 using two fasteners 120. The fasteners 120 may threadedly engage the first end cap 116 such that the first connector 124 may be releasably attached to the first end cap 116. In other configurations, more or less than two fasteners 120 may be used to attach the first connector 124 to the first end cap 116. Fasteners 120 may include screws, bolts, nails, or other fastening devices. Alternatively, the first connector 124 may be integral with the first end cap 116. The first connector 124 may be a Micro-D (MDM) connector, which includes a plurality of metal contacts. The MDM connector may include different numbers of contacts, depending on the particular configuration of the battery assembly 10. In one embodiment, the first connector 124 includes between 10 and 30 contacts. In another embodiment, the first connector 124 includes 25 contacts. In a further embodiment, the first connector 124 includes 15 contacts. The first connector 124 may include either the female contacts or the male contacts of the MDM connector. Though the first connector 124 is described as comprising an MDM connector, any type of connector suitable for connecting electrical components may be used. The first connector 124 is configured to releasably connect the battery 20 to the module 30, which will be discussed further below.

The first end 108a further includes a memory unit 112 integral with the battery 20. The memory unit 112 is electrically connected to the first connector 124 through electrical connector 128, and is configured to receive and store information related to the operation of the battery 20. The memory unit 112 may be configured such that the information stored within the memory unit 112 is continuously updated during operation of the battery assembly 10, and may be accessed by the drilling operator after the battery assembly is taken out of use for analysis. The types of information that may be stored in the memory unit 112 include current draw, temperature, estimated remaining capacity, voltage, shock experienced over a period of time, and vibration experienced over a period of time, amongst others. The memory unit 112 may also include physical information about the battery 20, such as part information, serial numbers, etc. The memory unit 112 may include any suitable type of non-volatile memory (such as ROM, flash memory, etc.). However, the memory unit 112 may also include a volatile memory component as desired (such as some types of RAM), or a combination of volatile and non-volatile memory.

Continuing with FIGS. 3A-3C, the central portion 108b extends from the first end 108a to the second end 108c, and includes the battery cell 140. The battery cell 140 may include any variety of batteries commonly used in downhole drilling operations. For example, the battery 20 can be a Lithium Thionyl Chloride battery, Lithium Sulfuryl Chloride battery, Lithium Bromine Chloride battery, Lithium Carbon Fluoride battery, or any other type of battery as desired. Typically, the battery cell 140 will be non-rechargeable, and thus is disposable. However, a battery assembly 10 including a battery cell 140 that is rechargeable is contemplated. The battery cell 140 can comprise a single battery cell, or multiple battery cells (for example, 8-10 battery cells) welded together to create a single battery cell 140. The battery cell 140 is electrically connected to the first connector 124, such that power is transferred to the downhole tool 60 powered by the battery assembly 10 through the first end 108a of the battery 20.

Figure 4A:
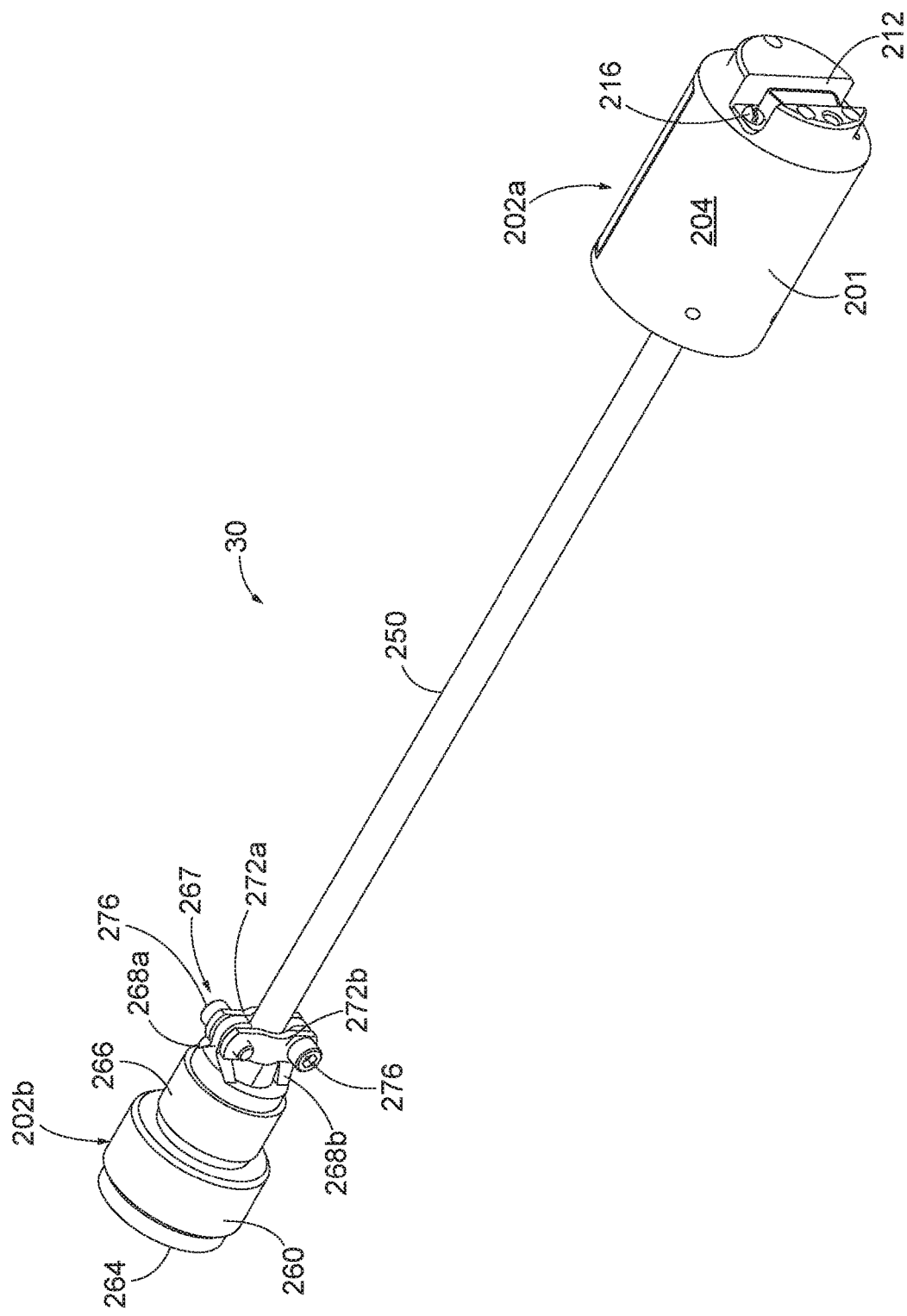
FIG. 4A is a perspective view of the module of the battery assembly shown in FIG. 2.
Figure 4B:
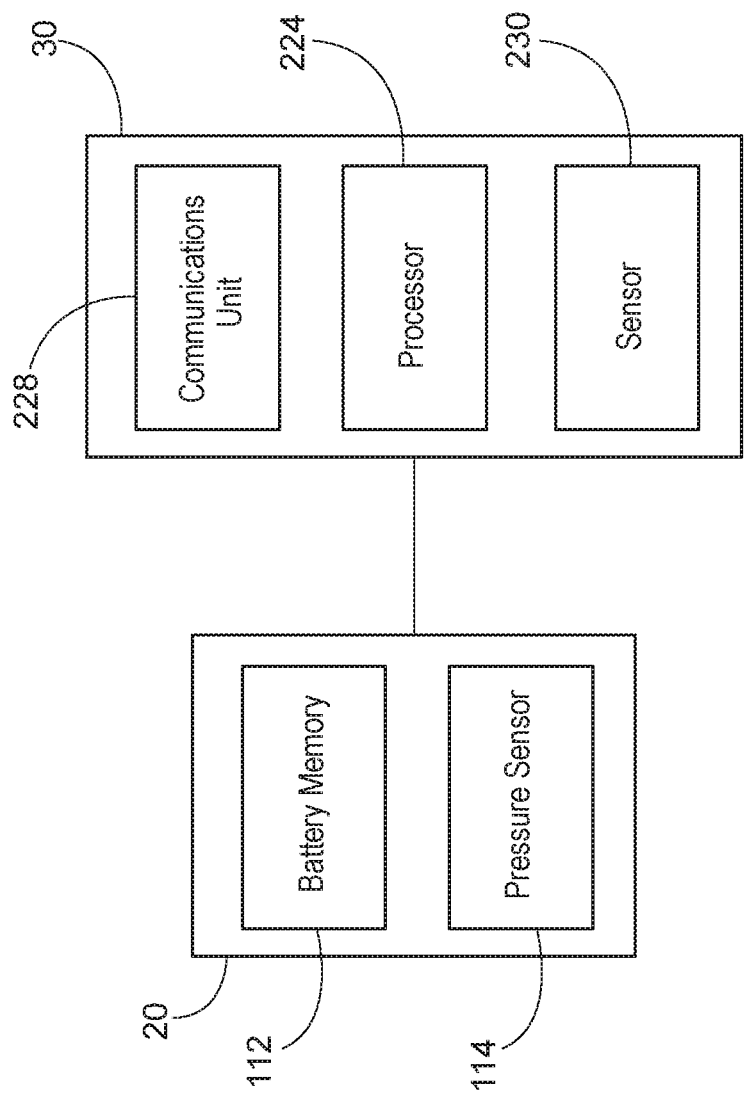
FIG. 4B is a schematic of the battery assembly shown in FIG. 2.

The central portion 108b may also include a pressure sensor 114, shown schematically in FIG. 4B. The pressure sensor 114 may be configured to detect a pressure change within the central portion 108b, which may be indicative of a crack or rupture in the outer surface 104 of the battery 20. Any opening in the outer surface 104 may allow fluid and/or toxic gases from the battery cell 140 to leak out of the battery 20, which can render the battery 20 nonoperational and potentially dangerous, as well as damage other components of the drilling system 1. As a result, the pressure sensor 114 may be preset to send a signal to the processor 224 upon sensing a pressure that surpasses a predetermined pressure threshold that would indicate that the battery 20 is venting fluid into the surroundings. In one embodiment, the pressure threshold is about 35 psi. The pressure threshold may correspond to a value just above atmospheric pressure. Alternatively, the pressure threshold may be higher if a portion of the battery 20 is filled with an inert gas. The pressure sensor 114 may comprise a pressure transducer, pressure switch, or rupture device.

The second end 108c of the battery 20 may include a second end cap 144 that is received within the body 101 of the battery 20. Like the first end cap 116, the second end cap 144 is optionally removable from the battery 20 such that the internal components of the battery 20 may be accessed. The second end cap 144 may also be secured to the body 101 of the battery 20 through an interference fit, or any other means as desired, including a snap fit, threaded engagement, or through the use of fasteners. Alternatively, the second end cap 144 may be irremovably attached to the body 101 through welding, adhesives, etc. The second end 108c of the battery 20 also includes a second end connector 148. The second end connector 148 may be an MDM connector, or may be any other type of suitable electric connector. The second end connector 148 may be releasably attached to the second end cap 144 by fasteners 152, which may be screws, nuts, nails, or any other type of fastening device. The second end connector 148 is electrically connected to a centralizer (not shown) that mechanically centralizes the battery 20 within the drill string 6. The centralizer can also electrically connect the battery 20 to an adjacent device within the drill string 6, which can be another battery 20 or a module 30.

Now referring to FIGS. 4A-9, the battery assembly 10 includes a module 30 removably coupled to the battery 20. The module 30 defines a first end 202a and a second end 202b opposite the first end 202a. The first and second ends 202*a* and 202*b* may be connected by an elongate element 250 that extends between the first and second ends 202*a* and 202*b*. The elongate element 250 may function to both physically and electrically connect the first and second ends 202*a* and 202*b*. In one embodiment, the elongate element 250 may be a flexible sleeve that contains wiring. However, the elongate element 250 may be alternatively configured as desired. The elongate element 250 may define a first end 250*a* and a second end 250*b* opposite the first end 250*a*. The first end 250*a* may be attached to the first end 202*a* of the module 30, and the second end 250*b* may be attached to the second end 202*b* of the module 30.

The first end 202*a* of the module 30 includes a chassis 201 that defines an outer surface 204 of the first end 202*a*. The chassis 201 may define a hollow closure, such as a metal shell, that houses the components of the first end 202*a*. The first end 202*a* also includes a first connector 212. When the module 30 is coupled to the battery 20, the first connector 212 may be removably coupled to the first connector 124 of the battery 20, such that information may be transmitted to and from the battery 20 through the first connector 124. Like the first connector 124, the first connector 212 of the module 30 may be an MDM connector. The first connector 212 may include the female contacts of the MDM connector when the first connector 124 includes male contacts, or the first connecter 212 may include the male contacts when the first connector 124 includes the female contacts. However, the first connector 124 may also be another form of connector other than an MDM connector, such as any type of connector suitable for connecting electrical components may be used. The first connector 212 may be releasably connected to the first end 202*a* via fasteners 216, which may be screws, bolts, nails, or other fastening devices. Alternatively, the first connector 212 may be integral with the chassis 201.

The chassis 201 of the first end 202*a* may contain a circuit board 220 electrically connected to a processor 224, a communications unit 228, and a sensor 230. The sensor 230 may include one sensor, or more than one sensor as desired. For example, the sensor 230 may include a current sensor that measures a current draw of the battery 20 of a period of time, a temperature sensor that monitors the temperature of the battery 20, a voltage sensor that monitors voltage data of the battery 20 over a period of time, and/or an accelerometer that monitors vibration and/or shock of the battery 20 over a period of time when the module 30 is connected to the battery 20. The sensor 230 may transmit any information collected to the processor 224, which monitors the information collected by the sensor 230 related to the battery 20. For example, the processor 224 may be configured to analyze the information received from the sensor 230 and determine whether the information related to the battery 20 falls within an acceptable range of operation. However, the processor 224 may be configured to further analyze and evaluate the information received from the sensor 230 as desired. The processor 224 can transmit the information received from the sensor 230 to the communications unit 228, which may transmit the information through the first connector 212 to the battery 20, particularly the memory unit 112, when the module 30 is connected to the battery 20. In this way, the module 30 is configured to transmit information including the estimated remaining capacity of the battery 20, current draw of the battery 20, temperature of the battery 20, voltage data of the battery 20 over a period of time, and vibration and/or shock of the battery 20 from the sensor 230 to the memory unit 112 of the battery 20. However, this is not meant to be limiting, as the sensor 230 may include other types of sensors, and thus the module 30 may transmit other types of information to the memory unit 112 of the battery 20. The communications unit 228 may also transmit the information received to a master bus 100, which may further transmit the information to the drilling operator, which will be discussed further below.

The first end 202*a* of the module 30 is connected to the first end 250*a* of the elongate element 250. In the depicted embodiment, the first end 202*a* includes a collar 232 that is disposed around the first end 250*a* of the elongate element 250, as well as fasteners 236 that extend through holes in the collar 232 to secure the elongate element 250 to the first end 202*a* of the module 30. When the fasteners 236 are fully tightened to the collar 232, the bore of the collar 232 securely contacts the elongate element 250, thus securing the first end 202*a* within the collar 232 through an interference fit. To detach the elongate element 250 from the first end 202*a* of the module 30, the fasteners 236 can be loosened within the holes of the collar 232, which allows the first end 250*a* of the elongate element 250 to slide out of the bore of the collar 232. However, other methods of attaching the elongate element 250 to the first end 202*a* of the module are contemplated. For example, the elongate element 250 may be directly secured to the first end 202*a* without the use of a collar, such as through a threaded connection. Alternatively, the first end 250*a* of the elongate element 250 may be integral with the first end 202*a* of the module 30.

Figure 5:
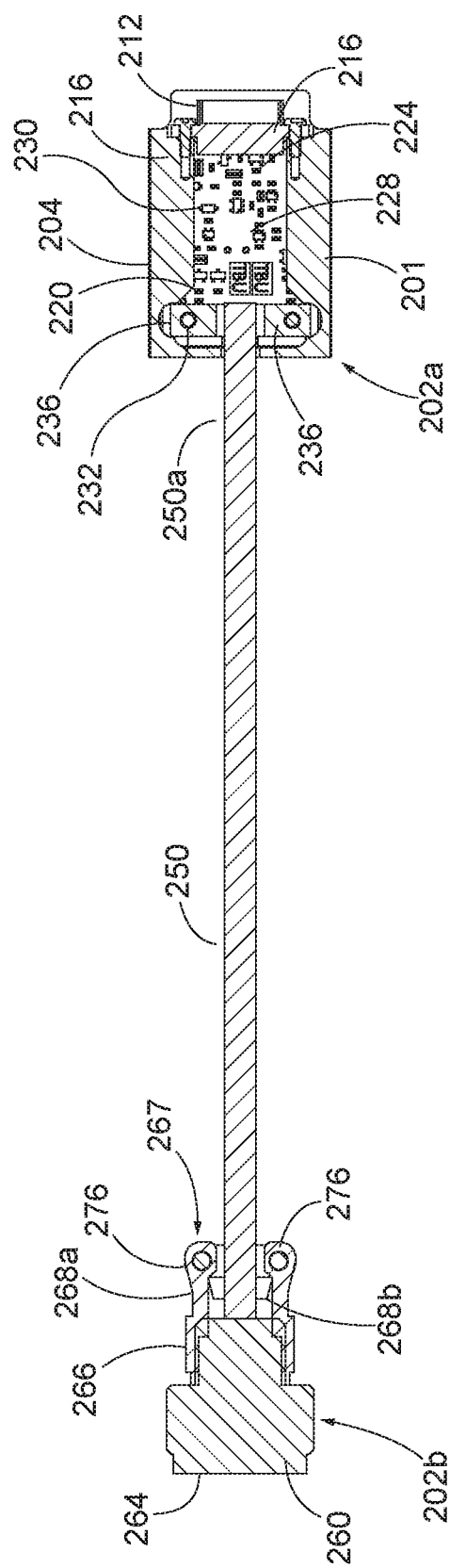
FIG. 5 is a longitudinal cross section of the module shown in FIG. 4A.
Figure 6:
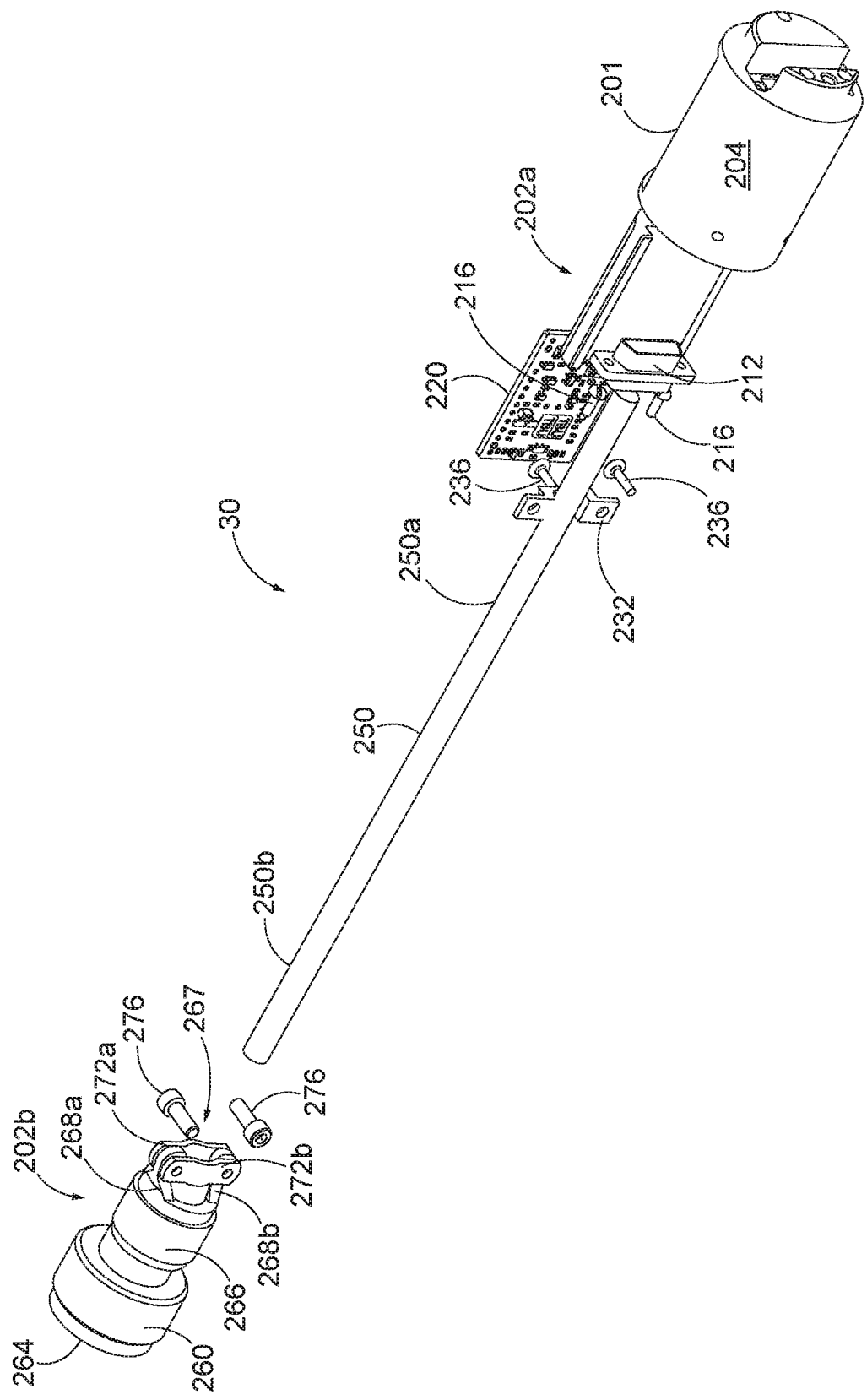
FIG. 6 is an exploded perspective view of the module shown in FIG. 4A.
Figure 7:
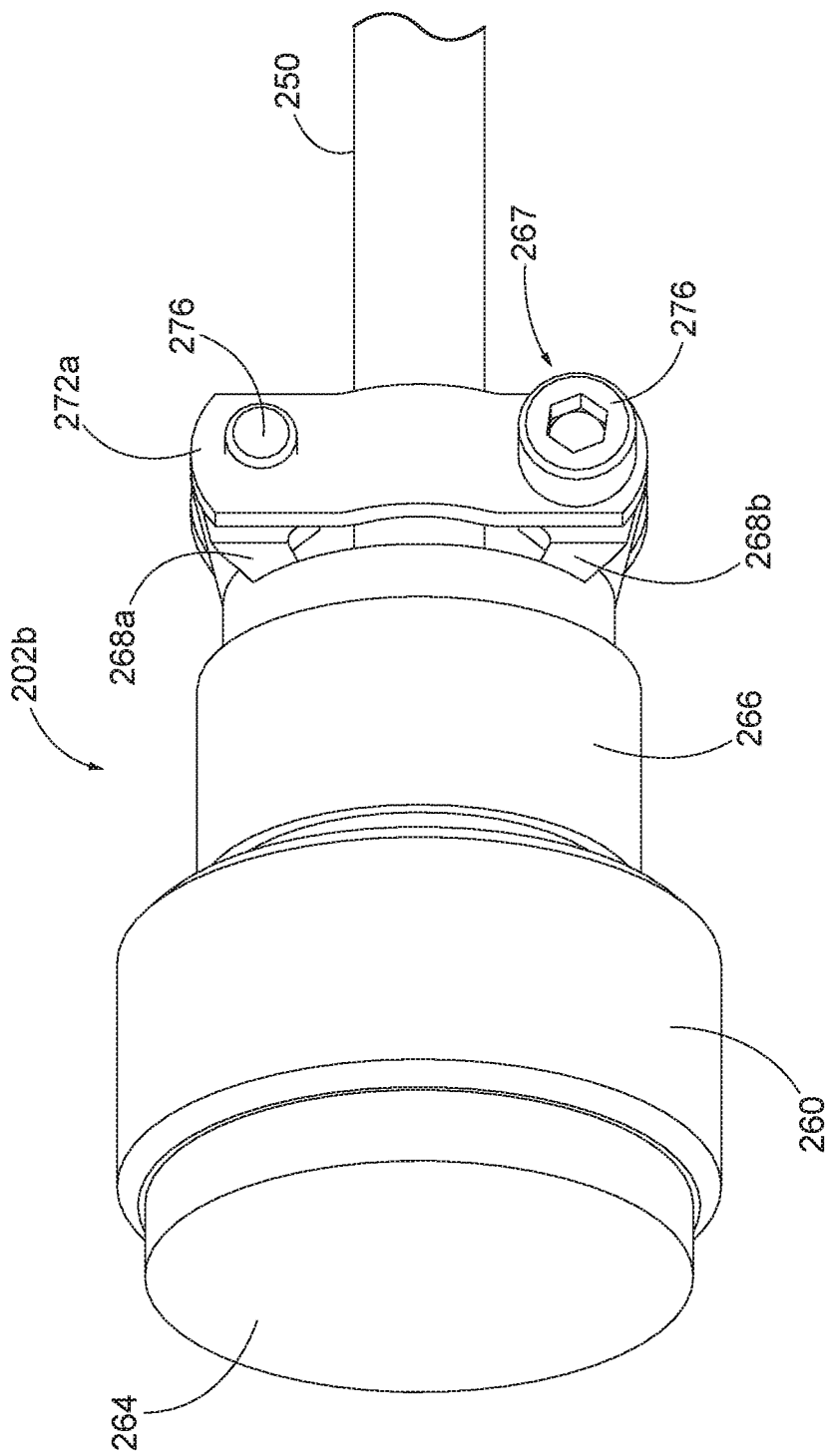
FIG. 7 is a perspective view of the second connector of the module shown in FIG. 4A.
Figure 8:
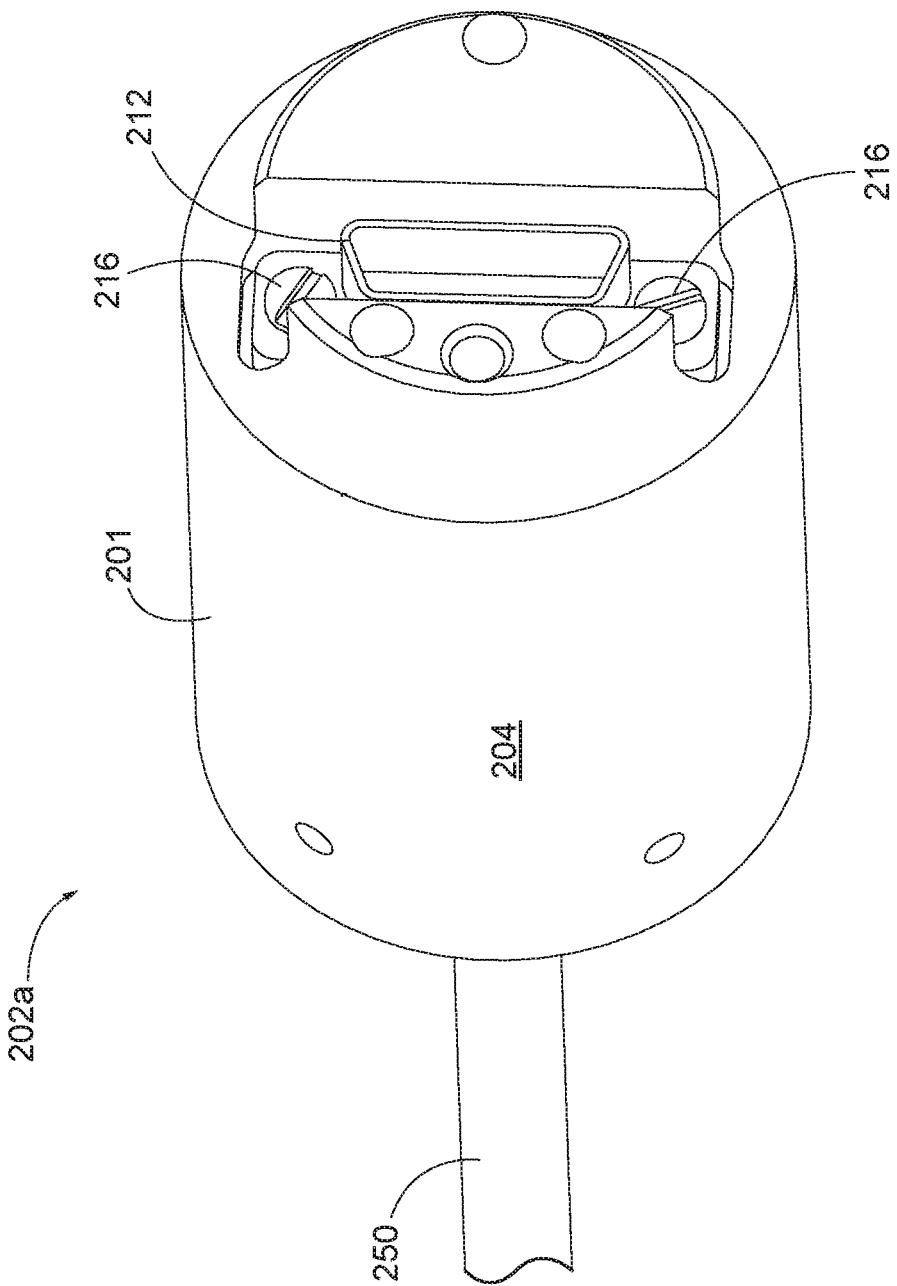
FIG. 8 is a perspective view of the first connector of the module shown in FIG. 4A.
Figure 9:
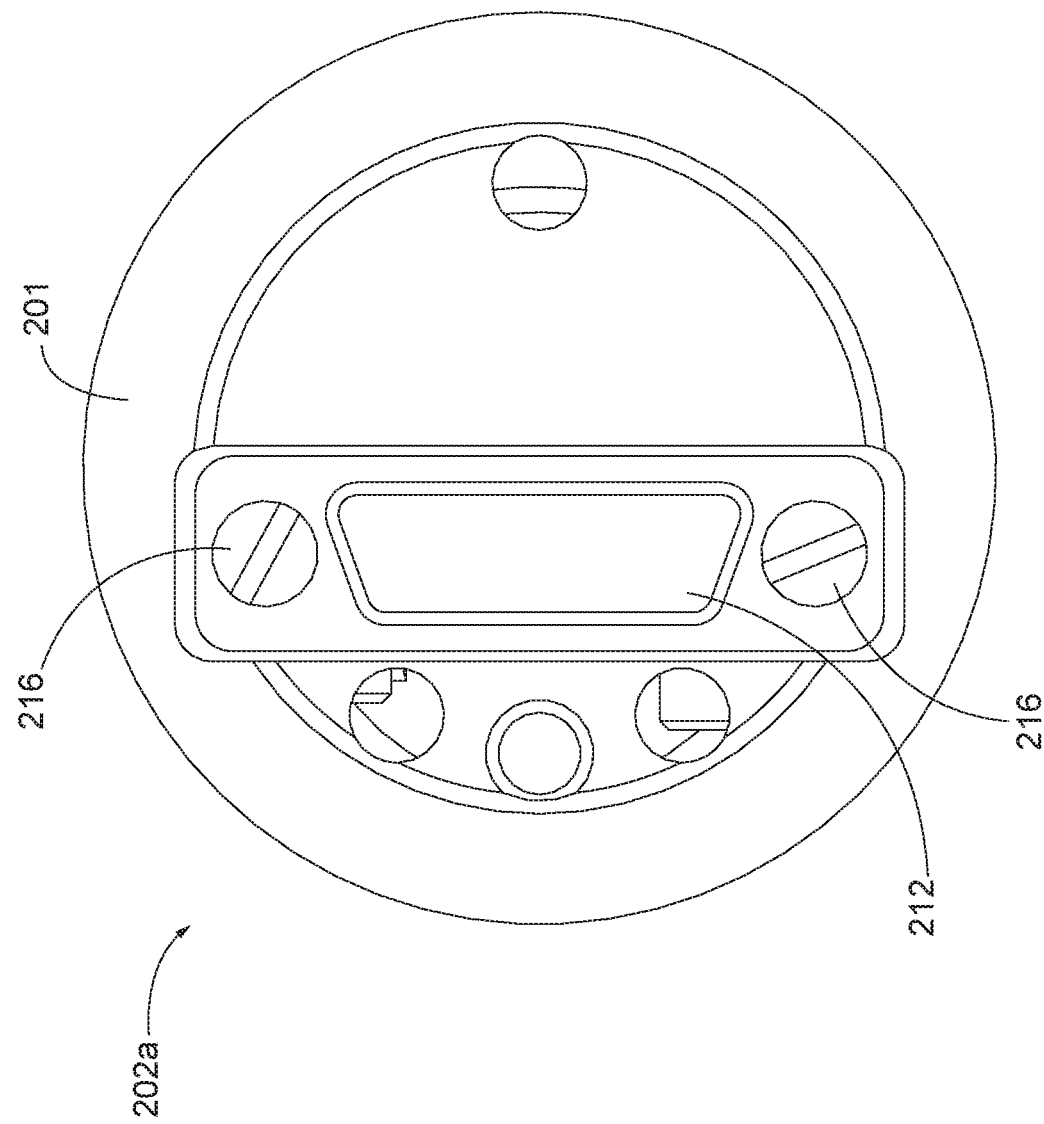
FIG. 9 is a side view of the first connector of the module shown in FIG. 4A.

Continuing with FIGS. 5-7, the module 30 also includes a second end 202*b* opposite the first end 202*a*. The second end 202*b*, which defines a body 260, may be connected to the second end 250*b* of the elongate element 250. In the depicted embodiment, the second end 202*b* is connected to the elongate element 250 through a connection assembly 267. The connection assembly 267 may include a first bar 272*a* and a second bar 272*b*, where each of the first and second bars 272*a* and 272*b* defines at least two holes. Each of the holes of the first and second bars 272*a* and 272*b* may be configured to receive a fastener 276, such as a screw or threaded bolt. The second end 202*b* of the module 30 may include a sleeve 266 that defines a first arm 268*a* and a second arm 268*b* that also each define a hole that is configured to receive one of the fasteners 276.

To connect the second end 202*b* of the module 30 to the elongate member 250, the first and second bars 272*a* and 272*b* are placed on opposite sides of the second end 250*b* of the elongate member, such that the holes of the first and second bars 272*a* and 272*b* align. Then, the first arm 268*a* is disposed between the first and second bars 272*a* and 272*b* such that the hole of the first arm 268*a* aligns with one of the holes of each of the first and second bars 272*a* and 272*b*, respectively. Also, the second arm 268*b* is disposed between the first and second bars 272*a* and 272*b* such that the hole of the second arm 268*b* aligns with one of the holes of each of the first and second bars 272*a* and 272*b*, respectively. Then, a fastener 276 is disposed through the first and second bars 272*a* and 272*b* and the first arm 268*a* such that the first and second arms 272*a* and 272*b* are releasably attached to the first arm 268*a*, and another fastener is disposed through the first and second bars 272*a* and 272*b* and the second arm 268*b* such that the first and second arms 272*a* and 272*b* are releasably attached to the second arm 268*b*. When the fasteners 276 are tightened, the first and second arms 272*a* and 272*b* may compress around the second end 250*b* of the elongate member 250, which may secure the elongate member 250 to the second end 202*b* of the module 30. Alternatively, the elongate member 250 may be directly connected to the second end 202*b*, such as through a threaded connection. Also, the elongate member 250 may be integral with the second end 202b of the module 30.

The body 260 of the second end 202b of the module 30 may be attached to the sleeve 266, such that the body 260 is secured to the elongate member 250. As shown, a portion of the sleeve 266 is disposed around a portion of the body 260, and may attach to the body 260 using a variety of methods. For example, the sleeve 266 may be threadedly attached to the body 260. Alternatively, the sleeve 266 may form an interference fit around the body 260. The body 260 further defines a second connector 264. The second connector 264 may electrically connect the second end 202b of the module 30 to the controller, a downhole tool 60, or another battery assembly 10. The second connector 264 may comprise an MIL-DTL-38999 connector. However, the second end connector 264 may be another form of connector designed to withstand the high environmental and mechanical stresses encountered downhole during a drilling operation.

The battery assembly 10 as described above may aid in reducing material costs for a drilling well operator, decrease financial loss due to cessation of drilling, and increase the ability to monitor remaining battery capacity. The inclusion of the module 30 allows the drilling operator to monitor battery capacity continuously and likewise select an opportune time to remove the battery 20 from the drilling system 1, such as when the capacity of the battery 20 reaches a predetermined level. In batteries without the functionality provided by the module 30, drilling operators may be forced to guess as to when batteries reach a low capacity, which may result in premature battery removal. Alternatively, drilling operators may wait until the batteries are fully depleted and cease powering the downhole tool 60, which is undesirable.

Further, because the module 30 is removably coupled to the battery 20 allows certain components of the module 30, such as the processor 224 and the sensor 230, to be separated from the battery 20. Many of the batteries typically used in drilling operations are non-rechargeable, and thus must be disposed upon depletion. Batteries that integrally include intelligence components like the processor 224 and sensor 230 described above are expensive to use, as the intelligence components, which may be expensive themselves, must be discarded with the battery. Use of the battery assembly 10, including the battery 20 and the removable module 30, allows the drilling operator to discard only the battery 20 upon battery depletion while retaining the module 30 for use in subsequent battery assemblies 10. This prevents the operator from being forced to repeatedly purchase a battery 20 along with integral intelligence components. Additionally, the battery 20 includes the integral memory unit 112, which allows the information related to a specific battery to be preserved. Even when the module 30 is removed from the battery 20, the drilling operator can access the memory unit 112 and evaluate the historical information related to the battery 20, including the charge level of the battery 20.

Figure 10:
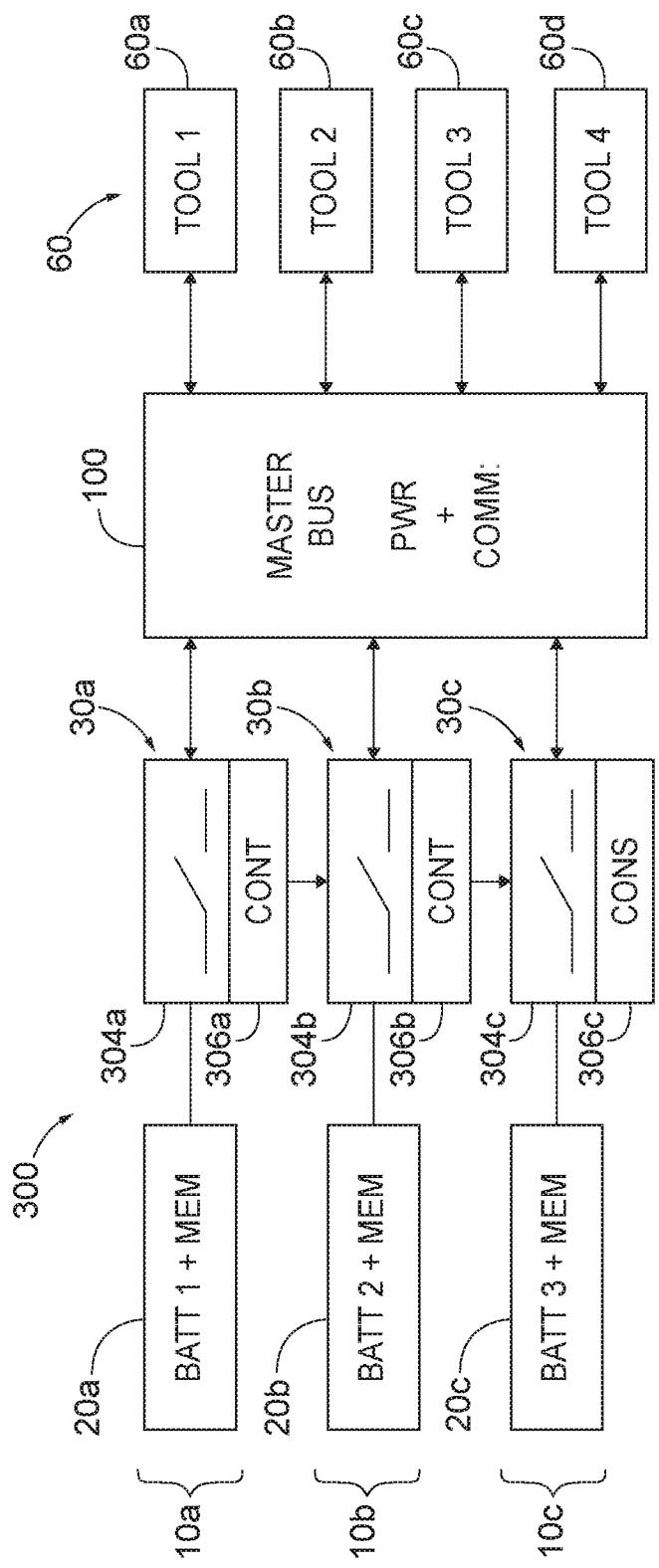
FIG. 10 is a schematic view of a battery system according to an embodiment of the present disclosure.

Continuing with FIG. 10, multiple battery assemblies 10 may be used to power a downhole tool 60. As such, the battery assembly 10 may be included in a battery system 300 to power a downhole tool 60. The depicted battery system 300 powers multiple downhole tools 60, such as downhole tools 60a-60d. The downhole tools 60a-60d may be any type of tool commonly used in downhole drilling, as previously mentioned. For example, the downhole tools 60a-60d may include a combination of a rotary steerable motor tool, a vibration damping tool, a measurement-while-drilling tool, a logging-while-drilling tool, or a downhole measurement tool. Though four downhole tools 60a-60d are shown, the battery system 300 may power more or less downhole tools 60 as desired. In the depicted embodiment, the battery system 300 includes three battery assemblies 10a-10c connected in parallel. As described above, each battery assembly 10a-10c includes a battery 20a-20c, as well as a removably attached module 30a-30c. However, an operator of the battery system 300 may interchangeably remove or add battery assemblies 10 from the battery system 300 due to changed circumstances or requirements, such as power depletion of one of the batteries 20, increased power requirements of a downhole tool 60, etc. When connected to the battery system 300, each battery assembly 10a-10c is electrically connected to a master bus 100, described further below, as well as the adjacent battery assembly 10 within the battery system 300 via the module 30. For example, module 30a is electrically connected to module 30b, and module 30b is electrically connected to modules 30a and 30c. All of modules 30a-30c are electrically connected to the master bus 100.

Each of the modules 30a-30c includes at least one switch 304 and at least one controller 306. As such, module 30a includes switch 304a and controller 306a, module 30b includes switch 304b and controller 306b, and module 30c includes switch 304c and controller 306c. For the controller, reference numbers 306 and 306a-306c may be used interchangeably. Likewise, for the switch, reference number 304 and 304a-304c may be used interchangeably. The switch 304 and controller 306 may comprise a part of the processor 224 of each module 30, or alternatively, the switch 304 and controller 306 may be separate from the processor 224. The switch 304 of each battery assembly 10 controls whether the respective battery 304 the switch 304 is attached to provides power to the battery system 300. When the switch 304 is activated, the battery 20 that particular switch is attached to transitions to an activated state, where the battery 20 provides power to the battery system 300. When the switch 304 is deactivated, the battery 20 that particular switch is attached to transitions to a deactivated state, in which the battery 20 does not provide power to the battery system 300.

Each switch 304 is controlled by a respective controller 306, which is electrically connected to both the processor 224 of each battery assembly 10 and the master bus 100. Each controller 306 may be configured to selectively activate the respective switch 304 to which the controller 306 is attached, as well as direct another controller 306 to active or deactivate the respective switch 304 to which it is connected. The directions each controller gives 306 may be highly dependent upon the tools 60a-60d that the battery system 300 is powering, the state of the respective battery 20 connected to the controller 306, the state of other batteries 20 within the battery system 300, and/or directions received from the master bus 100. The master bus 100 may serve as a central hub for communication between all of the battery assemblies 10a-10c, as well as communication between the battery assemblies 10a-10c, the downhole tools 60a-60d, and an operator of the drilling system 1. The master bus 100 may include a power port that links the battery assemblies 10a-10c to each of the tools 60a-60d and a communications port that allows the drilling operator to communicate with the master bus 100, as well as each of the battery assemblies 10a-10c. The master bus 100 may further include predefined programs that include a fixed set of instructions for directing operation of the battery assemblies 10a-10c. The ability of the master bus 100 to communicate with the battery assemblies 10a-10c and downhole tools 60a-60d allows data collected by all of these components to be uniformly time stamped, such that all information can be referenced using a uniform time system.

Figure 11:
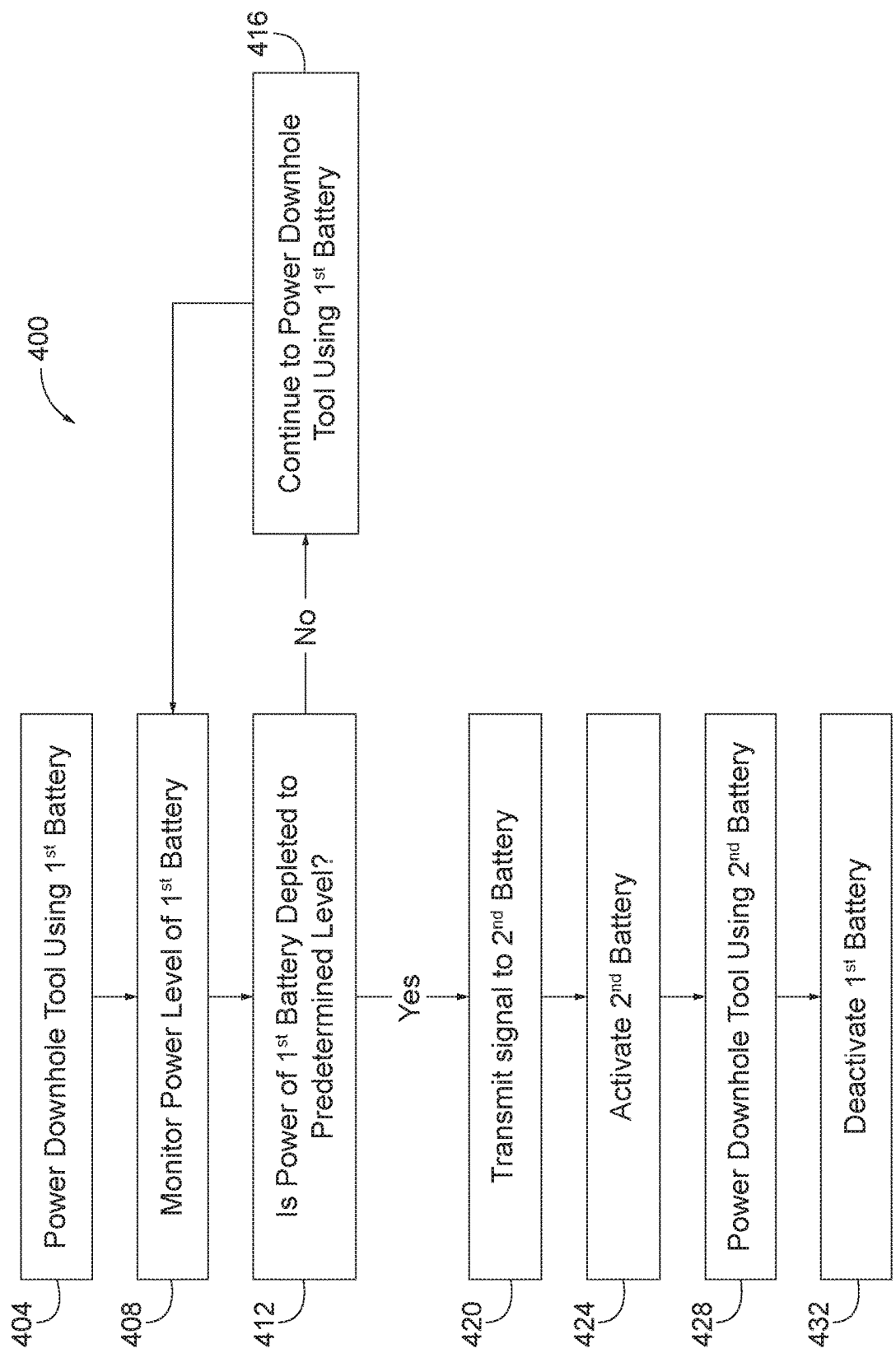
FIG. 11 is a process flow diagram illustrating a method for powering a downhole tool according to an embodiment of the present disclosure.

FIG. 11 depicts one method 400 of operating a downhole tool 60 using the battery system 300. In step 404, the battery system 300 supplies power to the downhole tool 60 from battery 20a of battery assembly 10a (also referred to as the first battery 20a and first battery assembly 10a, respectively). This step may include the master bus 100 signaling the controller 306a to activate the switch 304a, which thus transitions the first battery 20a to an activated state, in which the first battery 20a provides energy to the downhole tool 60. This signal may be provided in response to a direction given to the master bus 100 by an operator of the drilling system 1, or in response to the initiation of a program stored in the master bus 100. In step 408, the processor 224 of the first battery assembly 10a monitors the estimated remaining capacity of the first battery 20a. Depending on the power requirements of the downhole tool 60 powered by the first battery 20a, the capacity of the first battery 20a may decrease at different rates over time, such that constant monitoring of the capacity of the first battery 20a is required. If the capacity of the first battery 20a is not monitored, the drilling operator may not know that the first battery 20a has a low capacity until the first battery 20a is completely depleted and the downhole tool 60 ceases operation. This may result in a break in the drilling operation for a period of time, which can be costly to the drilling operator and detrimental to the overall drilling operation.

While step 408 is being performed, the processor 224 may intermittently or continuously perform step 412, which includes determining whether the capacity of the first battery 20a is depleted to a predetermined level. To perform step 412, the processor 224 may compare the estimated remaining capacity of the first battery 20a to a level that is preset by the operator of the drilling system 1 or stored within the master bus 100 or processor 224. The predetermined value stored within the battery system 300 may be determined by past experience from operations of the downhole tool 60 in other drilling systems or from test experience via simulations. For example, the predetermined value may be from about 20 to about 25 volts. The predetermined value may be defined as the lowest amount of power required to power the downhole tool 60, plus an additional amount as a safeguard. This safeguard ensures that the controller 306a can take action before the capacity of the first battery 20a depletes to a level where it can no longer power the downhole tool 60. Additionally, if the first battery 20a depletes below the predetermined value, continued operation of the first battery 20a may be unsafe and present a variety of dangerous conditions, such as explosion of the first battery 20a or venting of toxic gases produced by the first battery 20a.

If during step 412 the processor 224 of the first battery assembly 10a determines that the remaining capacity of the first battery 20a exceeds the predetermined level, the method proceeds to step 416, in which the battery system 300 continues to power the downhole tool 60 using the first battery 20a. Step 416 loops back to step 408, where the processor 224 continues to monitor the remaining capacity of the first battery 20a. Steps 408-416 may then be repeated indefinitely. However, once the processor 224 in step 412 determines that the remaining capacity of the battery 20a is depleted to the predetermined level, the method 400 proceeds to step 420. In step 420, a signal is sent to the controller 306b of the battery assembly 10b (also referred to as the second battery assembly 10b) that directs the controller 306b to activate the switch 234b, which transitions the battery 20b (second battery 20b) to an activated state. This signal may be sent either from the controller 306a of the first battery assembly 10a or from the master bus 100 to the controller 306b of the second battery assembly 10b. Further, the signal may be sent automatically by the controller 306a in response to the determination in step 412, or may be sent manually by the drilling operator. Additionally, a signal may be sent from the master bus 100 to a surface system, where the drilling operator may be notified that the charge of the first battery 20a has been depleted to the predetermined level, and the second battery 20b is being transitioned to the activated state. The signal sent from the master bus 100 to the surface system may further include additional information concerning the first and second battery assemblies 10a and 10b as desired. After the second battery 20b is transitioned to the activated state in response to the signal sent in step 420, the battery system 300 powers the downhole tool 60 in step 428 using the second battery 20b. During step 428, both the first and second batteries 20a and 20b may be simultaneously in an activated state, and thus both may power the downhole tool 60 for a period of time. This overlap may be desirable to ensure that there is no gap in power supplied to the downhole tool 60. Once step 428 has fully commenced, and the second battery 20b has begun powering the downhole tool 60, the method can proceed to step 432, in which the controller 306a directs the switch 304a to transition the first battery 20a to a deactivated state, in which the first battery 20a no longer powers the downhole tool 60.

While performing the method 400, a battery event may occur that presents dangerous operating conditions, such as explosion of a battery assembly 10 or venting of toxic gasses from a battery assembly 10, either due to decreased capacity of the battery 20 or otherwise. If such an even occurs, the master bus 100 will lose communication with that particular battery assembly 10 or detect that the battery 20 of that particular battery assembly 10 is not functioning. In response, the master bus 100 can flag that battery 20 as potentially hazardous and transmit such information uphole, thus notifying the drilling operator. As a result, the drilling operator can take appropriate actions, such as stopping the drilling operation and taking appropriate precautions when removing the problematic battery assembly 10.

Though the method 400 is described as relating to the transition between powering the downhole tool 60 using the first battery 20a and powering the downhole tool 60 using the second battery 20b, the method 400 is repeatable for additional battery assemblies 10. For example, once the method 400 begins step 432, the method 400 may be repeated, with the exception that the first battery 20a in method 400 is substituted with the second battery 20b, and the second battery 20b is substituted with battery 20c (also referred to as the third battery 20c). The method 400 can be subsequently repeated for as many batteries 20 as exist within the particular battery system 300, such that each battery 20 is sequentially activated.

Referring back to FIG. 10, as noted above, the battery system 300 may include any number of battery assemblies 10 as desired. However, communication between the master bus 100 and the controllers 306 of the battery assemblies, as well as between the various controllers 306 of the battery assemblies, can become problematic as battery assemblies 10 are replaced and added to the system, as differentiating a specific battery assembly 10 from the other battery assemblies 10 for the purposes of sending a signal may become difficult over time. As such, each battery 20 is assigned a unique identifier, also referred to as a node address, upon being attached to the battery system 300. This identifier may allow the master bus 100, the controllers 306, and the drilling operator to reference an identifier of a particular battery 20 to identify the position of that battery 20 within the battery system 300, as well as the position of that battery 20 with respect to other batteries 20 within the battery system 300. The assignment of a unique identifier also allows each battery 20 in a plurality of battery assemblies 10 to be sequentially activated by the controllers 306. For example, the method 400 may include assigning a first identifier to the first battery 20a of the first battery assembly 10a, as well as assigning a second identifier to the second battery 20b of the second battery assembly 10b. These first and second identifiers may indicate the position of the first and second battery assemblies 10a and 10b relative to each other. This relative position may indicate to the master bus 100, the drilling operator, and the controllers 306 the particular sequence for activation of the first and second batteries 20a and 20b. The processor 224 of each respective module 30 can self-identify the position and node address of each of the first and second battery assemblies 10a and 10b and communicate this information to other components in the battery system 300. In addition to the first and second battery assemblies 10a and 10b, this method of assigning identifiers may be utilized for any number of battery assemblies 10 added to the battery system 300. Further, identifiers may be reusable, such that when a particular battery assembly 10 is replaced with another battery assembly 10, the new battery assembly 10 may be assigned the same identifier as the removed battery assembly 10. However, the battery assemblies 10 previously connected to the battery system 300 may also be renumbered, such that all of the battery assemblies 10 within the battery system 300 are assigned a new identifier that reflects their relative positions along the drill string 6.

In addition to method 400, an operator of the drilling system 1 may decide to override the automated battery switching method and rather manually switch the supply of power to the downhole tool 60 from one battery 20 to another, such as from the first battery 20a to the second battery 20b. This may be desirable when a program that automatically implements method 400 is not being run, or when a battery assembly 10 is being deactivated for a reason other than the battery having a low charge, such as due to damage or defect. To manually switch the supply of power from the first battery 20a to the second battery 20b, the operator may send a signal to the master bus 100. This signal may direct the master bus 100 to instruct the controller 306a to deactivate the switch 304a, such that the first battery 20a is transitioned to the deactivated state. The signal may also direct the master bus 100 to instruct the controller 306b to activate the switch 304b, such that the second battery 20b is transitioned to the activated state. The activation of the second battery 20b may occur concurrently with or before the deactivation of the first battery 20a. The signal may be sent from the drilling operator to the master bus 100 via any means capable of transmitting a signal from an uphole location to a downhole instrument. For example, the drilling operator may send the signal to the master bus through mud pulse or electromagnetic telemetry.

While the method 400 discloses a method of sequentially activating singular batteries 20 within the battery system 300, certain drilling operations may require the activation of multiple batteries 20. For example, a downhole tool 60 may be connected to the battery system 300 that has power requirements that exceed the output capabilities of a single battery 20, or a downhole tool 60 that is in operation may transition to performing a new operation that has increased power requirements. As a result, the master bus 100 may be configured to automatically direct a number of controllers 306 to transition a number of additional batteries 20 sufficient to power the downhole tool 60 from the deactivated state to an activated state. The master bus 100 may activate the batteries 20 that are disposed next sequentially along the drill string 6 in relation to the batteries 20 already activated, or may select any combination of batteries 20 within the battery system 300 based upon predetermined parameters, such as remaining battery capacity, downhole tool 60 power requirements, etc. Alternatively, the drilling operator may decide which batteries 20 should be activated or deactivated, and likewise send a signal to the master bus 100 instructing such.

The method 400 allows for the efficient use of batteries 20 within the battery system 300. In systems that do not allow for sequential or selective activation of batteries, batteries connected in parallel may be all uniformly depleted over time. For example, in a simple drilling system with four batteries connected in parallel that does not have the capabilities disclosed above, the use of a charge equivalent to 2.25 batteries would result in all four batteries having 44% remaining capacity. This is not optimal, as a drilling operator may not want to use a battery having 44% capacity in a subsequent drilling system, as the cost to simply replace the battery may outweigh the cost to wait a short period of time to cease drilling operation to replace the battery. This results in the discard of a battery not fully depleted. In an embodiment where the battery system 300 includes four battery assemblies 10, the use of a charge equivalent to 2.25 batteries would result in two completely drained batteries, one with 75% capacity remaining, and one fully charged battery. Upon completion of this operation, the remaining capacity is concentrated in two batteries 20, which makes them better candidates for use in future drilling operations, and minimizes the likelihood that batteries 20 with capacity remaining will be discarded.

The present disclosure is described herein using a limited number of embodiments, these specific embodiments are not intended to limit the scope of the disclosure as otherwise described and claimed herein. Modification and variations from the described embodiments exist. More specifically, the following examples are given as a specific illustration of embodiments of the claimed disclosure. It should be understood that the invention is not limited to the specific details set forth in the examples.

What is claimed:

1. A battery assembly for a downhole tool used in drilling a borehole in an earthen formation, the battery assembly comprising:
   a battery having a first end, a second end opposite to the first end of the battery, and a memory unit integral with the first end of the battery, wherein the memory unit includes stored therein the information related to the battery; and
   a module configured to be removably coupled to the battery, the module having:
   a) a chassis;
   b) a first connector on the chassis, the first connector being configured to couple the module to the battery;
   c) a processor carried by the chassis, the processor being configured to monitor information related to the battery;
   d) a communications unit carried by the chassis, the communications unit configured to transmit the information related to the battery at least between the memory unit and the processor when the module is coupled to the first end of the battery and the processor is in electronic communication with the memory unit of the battery;
e) a second connector opposite to the first connector; and
f) a flexible sleeve coupled to the chassis and that contains wiring.

2. The battery assembly of claim 1, wherein the information related to the battery includes an estimated remaining capacity of the battery.

3. The battery assembly of claim 1, further comprising a current sensor configured to monitor a current draw of the battery over a period of time when the module is connected to the battery.

4. The battery assembly of claim 1, further comprising a temperature sensor configured to monitor a temperature of the battery over a period of time when the module is connected to the battery.

5. The battery assembly of claim 1, further comprising a voltage sensor configured to monitor a voltage of the battery over a period of time when the module is connected to the battery.

6. The battery assembly of claim 1, further comprising an accelerometer configured to monitor at least one of a vibration and shock of the battery over a period of time when the module is connected to the battery.

7. The battery assembly of claim 1, further comprising a pressure sensor that is configured to detect a pressure change.

8. The battery assembly of claim 1, wherein the battery is a non-rechargeable battery.

9. A module configured to be removably coupled to a battery used in a drilling operation that drills a borehole in an earthen formation, the module comprising:
a chassis;
a first connector on the chassis, the first connector being configured to be removably coupled to the battery;
a processor carried by the chassis, the processor being configured to monitor information related to the battery;
a communications unit carried by the chassis, the communications unit configured to transmit the information related to the battery at least between the memory unit and the processor when the module is coupled to the first end of the battery and the processor is in electronic communication with the memory unit of the battery;
a flexible sleeve coupled to the chassis and that contains wiring; and
a second connector coupled to the elongate element opposite to the first connector.

10. The module of claim 9, wherein the flexible sleeve is coupled to the second connector.

11. The module of claim 9, further comprising a current sensor configured to monitor a current draw.

12. The module of claim 9, further comprising a temperature sensor configured to monitor a temperature.

13. The module of claim 9, further comprising a voltage sensor configured to monitor a voltage.

14. The module of claim 9, further comprising an accelerometer configured to monitor at least one of a vibration and shock.

15. A battery system for a downhole tool for use in a drilling operation, the battery system comprising:
a plurality of battery assemblies, each battery assembly including:
a) a battery having a first end, a second end opposite to the first, and
b) a memory unit carried by the first end of the battery, wherein the memory unit includes stored therein information related to the battery; and
c) a processor configured to monitor information related to the battery, and
d) a communications unit configured to transmit the information related to the battery at least between the memory unit and the processor; and
e) a switch configured to selectively activate the battery;
a controller electrically coupled to each switch, wherein the controller is configured to monitor the plurality of battery assemblies and cause each switch to selectively activate the battery.

16. The battery system of claim 15, wherein the plurality of battery assemblies includes a first battery assembly and a second battery assembly,
wherein the first and second battery assemblies are configured to transition between a deactivated state and an activated state,
wherein the controller is configured to transmit a first signal to the first battery assembly that instructs the first battery assembly to switch to the activated state such that first battery assembly powers the downhole tool.

17. The battery system of claim 15, wherein the plurality of battery assemblies includes a first battery assembly and a second battery assembly,
wherein the first and second battery assemblies are configured to transition between a deactivated state and an activated state, and the controller is configured to transmit a signal to the first battery assembly and to the second battery assembly that causes the first and second battery assemblies to transition into the activated state, such that the first and second battery assemblies power the downhole tool.

18. The battery system of claim 15, wherein each battery is associated with a battery identifier, wherein the controller is configured to selectively activate the battery based on the battery identifier.

19. The battery system of claim 15, wherein the controller is configured to sequentially activate each battery in the plurality of battery assemblies.

20. The battery system of claim 15, wherein each of the plurality of battery assemblies includes a module that is configured to be removably coupled to the battery.

21. The battery system of claim 20, wherein each battery module contains the processor and the communications unit.

22. The battery system of claim 15, wherein each battery includes a pressure sensor that is configured to detect a pressure change.

23. A method of powering a downhole tool in a drilling operation that forms a borehole in an earthen formation, the method comprising:
supplying power to the downhole tool with a first battery of a first battery assembly;
determining, via at least one computer processor, a capacity of the first battery of the first battery assembly;
switching the supply of power to the downhole tool from the first battery of the first battery assembly to a second battery of a second battery assembly that is electrically coupled to the first battery assembly when the capacity of the first battery is depleted to a predetermined capacity;
continuing to supply power to the downhole tool with the second battery of the second battery assembly; and transmitting information concerning the first battery assembly and the second battery assembly to a surface of the earthen formation.

24. The method of claim 23, further comprising transmitting to a surface system an indication that the plurality of battery assemblies have a charge that is less than 25 volts.

25. The method of claim 23, wherein the capacity is a first capacity, and the method further comprises:
determining, via the at least one processor, a second capacity of the second battery of the second battery assembly;
when the capacity of the second battery is depleted to a predetermined capacity, switching the supply of power to the downhole tool from the second battery of the second battery assembly to a third battery of a third battery assembly that is electronically coupled to one or more of the first battery assembly and the second battery assembly;
continuing to supply power to the downhole tool with the third battery of the second third assembly.

26. The method of claim 23, wherein switching the supply of power to the downhole tool from the first battery to the second battery including switching the supply of power with an electronic switch disposed along a circuit that includes the first battery assembly and the second battery assembly.

27. The method of claim 23, wherein switching the supply of power to the downhole tool from the first battery to the second battery occurs automatically when the capacity of the first battery is depleted to the predetermined capacity.

28. The method of claim 23, further comprising:
assigning a first identifier to the first battery of the first battery assembly;
assigning a second identifier to the second battery of the second battery assembly, wherein the first identifier and the second identifier indicate a relative position of the first battery assembly relative to the second battery assembly, such that power supplied to the downhole tool occurs in sequence based on the respective identifiers.

29. The method of claim 23, further comprising:
receiving an instruction from the surface of the earthen formation to switch the supply of power to the downhole tool from the first battery to the second battery.

30. The method of claim 23, further comprising:
monitoring power requirements for one or more other components of the downhole tool; and
when the power requirement of one or more components of the downhole tool exceed a threshold, causing, via a controller, the first and second battery assembly to supply power to the one or more components of the downhole tool.

31. A downhole tool system for a drilling operation that includes a drill string configured to form a borehole in an earthen formation, the downhole tool comprising:
a downhole tool configured to be disposed along the drill string; and
a first battery assembly configured to power the downhole tool, the first battery assembly including;
a first battery coupled to the downhole tool, the first battery having a first end, a second end opposite to the first end, and a first memory unit integral with the first end of the first battery, wherein the first memory unit includes stored therein information related to the first battery; and
a first module removably coupled to the first end of the first battery, the first module including a first processor configured to monitor information related to the first battery, and a first communications unit configured to transmit the information related to the first battery at least between the first memory unit and the first processor when the first module is coupled to the first end of the first battery and the first processor is in electronic communication with the first memory unit of the first battery; and
a second battery assembly configured to power the downhole tool, the second battery assembly including;
a second battery coupled to the downhole tool, the second battery having a first end, a second end opposite to the first end of the second battery, and a second memory unit integral with the first end of the second battery, wherein the second memory unit includes stored therein information related to the second battery; and
a second module removably coupled to the first end the battery, the second module including a second processor configured to monitor an estimated capacity of the second battery, and a second communications unit configured to transmit the estimated capacity at least between the second memory unit and the second processor when the second module is coupled to the first end of the second battery and the second processor is in electronic communication with the second memory unit.

32. The downhole tool system of claim 31, wherein the first module further includes a current sensor configured to monitor a current draw of the first battery over a period of time.

33. The downhole tool system of claim 32, wherein the first module is configured to transmit the current draw of the first battery to the first memory unit so that the information stored in the first memory unit includes the current draw.

34. The downhole tool system of claim 31, wherein the first module further includes a temperature sensor configured to monitor a temperature of the first battery.

35. The downhole tool system of claim 34, wherein the first module is configured to transmit the temperature of the first battery to the first memory unit such that information stored in the first memory unit includes the temperature of the first battery.

36. The downhole tool system of claim 31, wherein the first module further includes a voltage sensor configured to monitor voltage data of the first battery over a period of time.

37. The downhole tool system of claim 36, wherein the first module is configured to transmit the voltage data of the first battery over the period of time to the first memory unit such that the information stored in the first memory unit includes the voltage data.

38. The downhole tool system of claim 31, wherein the first module further includes an accelerometer configured to monitor at least one of vibration and shock of the first battery over a period of time.

39. The downhole tool system of claim 38, wherein the first module is configured to transmit the at least one of the vibration and shock of the first battery to the first memory unit such that information stored in the first memory unit includes the vibration data.

40. The downhole tool system of claim 31, wherein the downhole tool is a rotary pulser, a rotary steerable motor tool, a vibration damping tool, a measurement-while-drilling tool, or a logging-while-drilling tool, or a downhole measurement tool.

* * * * *